Aug. 3, 1965  S. L. COLE, JR., ETAL  3,197,916
ELECTRIC ANIMAL TRAP
Filed Feb. 11, 1963

INVENTORS.
SAMUEL L. COLE, JR,
ALBERT F. SPURGEON,
RAYMOND I. KIGER and
ROBERT L. KING
BY Lockwood, Woolard, Smith & Wickart
Attorneys 3,197,916
ELECTRIC ANIMAL TRAP
Samuel L. Cole, Jr., R.R. 2, and Albert F. Spurgeon, 3746 S. Adams, both of Marion, Ind., and Raymond I. Kiger, 509 W. Virginia, Kokomo, Ind., and Robert L. King, R.R. 1, Jonesboro, Ind.
Filed Feb. 11, 1963, Ser. No. 257,448
3 Claims. (Cl. 43—66)

This invention relates generally to animal traps and more particularly to an electric animal trap which is particularly well suited to the trapping of rodents.

Heretofore, many means have been devised for the trapping of rodents. In addition to strictly mechanical means, electrical traps have also been devised. However, most electric traps heretofore known have been comparatively complicated devices which are not suited for the attainment of the desired effects.

It is, therefore, a general object of the present invention to provide an improved animal trap.

A further object is to provide an animal trap which is simple in construction and reliable, efficient and safe in operation.

A further object is to provide a trap facilitating the disposal of the trapped animal.

A further object is to provide a trap which is neat in appearance and which accommodates the use of a variety of materials and manufacturing methods.

The full nature of the invention will be understood from the accompanying drawings and the following description and claims.

Figure 1:
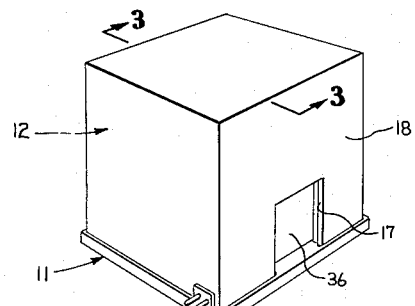
FIG. 1 is a perspective view of a typical embodiment of the present invention.

Referring to the drawings in detail, the illustrated embodiment includes a housing having as principal components thereof a base 11 and cover 12. Suitable means are provided for securing the cover to the base and the base may be provided with a groove 13 which is generally L-shaped as is apparent in FIG. 3. This groove extends adjacent the perimeter of the base. A small flange 16 is provided along the lower margin of the vertical wall of the cover and suitable flexibility can be provided in the cover or base to permit this flange to be snapped into the groove as the cover is installed on the base. An opening 17 is provided in the front wall 18 of the cover and accommodates entrance of the animal.

Two sets of bare electrical conductive strips are provided in the upper surface 14 of the base. The first set includes a trunk 19 and branches 21. The second set includes the trunk 22 and branches 23.

Electrical connector pins 24 and 26 are provided, and these may be of a size and spacing identical to that commonly employed for an electric shaver, if desired. Of course the size and spacing can be varied depending upon the type of electrical cord which is to be used for connection to the pins and depending upon an acceptable appearance being obtained. Electrical continuity from the pin 26 to the trunk 19 is provided by the wire 27 which is connected to the pin and which is connected to the trunk 19 by means of the rivet 28.

Electrical continuity from the pin 24 to the trunk 22 is provided by means including a switch which will be described hereinafter.

The trunks and branches shown may be obtained by the employment of an electrically conductive paint in the grooves 21-A and 23-A, for example. As an alternative construction, they could be obtained by the use of printed circuit techniques. Also, if desired, copper strips could be assembled and secured to the board or the base by rivets or other suitable means.

Figure 3:
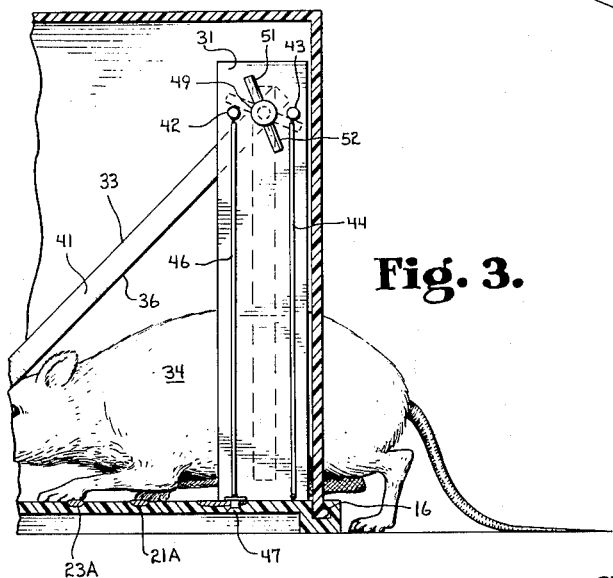
FIG. 3 is an enlarged fragmentary section of the unit of FIG. 1 taken along the line 3—3 in FIG. 1 and viewed in the direction of the arrows.

Upstanding supports 29 and 31 are disposed in parallel horizontally spaced relation. These supports are secured to the base and, if desired, may be an integral part of a molded base. Each of these supports has an aperture therein accommodating the hinge pin 32 which extends through the door 33 and is free to rotate in the supports. The hinge pin should be understood to be fixed with respect to the door so that it rotates in the supports when the door is swung to a position such as illustrated in FIG. 3, for example. Thus it is seen that the door 33 is free to swing inwardly on the hinge pin 32. It thereby facilitates entry of the rodent 34.

When the door is normally suspended vertically from the pin 32, its front face 36 covers the opening 17. However, the inside faces 37 and 38 of the supports 29 and 31 respectively are closely adjacent the edges 39 and 41 of the door. Also these faces extend horizontally in planes perpendicular to the axis of the hinge pin 32. They therefore preclude any possibility of the rodent opening the door by getting its nose between the front wall of the cover and the edge of the door. Consequently, once a rodent is inside the trap and the door has closed behind him, he cannot possibly open the door to depart.

Electrically conductive pins 42 and 43 may be mounted in the support 31. A wire 44 connects the pin 43 to the plug pin 24 in the side of the base. A wire 46 connects the pin 42 to the trunk strip 22, the rivet 47 being employed to make the connection.

Figure 2:
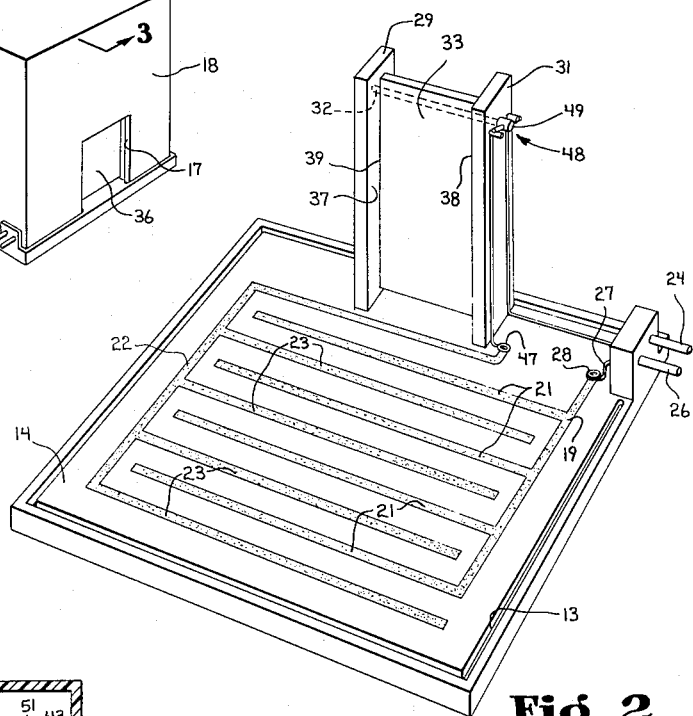
FIG. 2 is an enlarged perspective view of a component thereof.

A bridging contactor 48 has a central cup 49 which is secured to the end of the hinge pin 32. Arms 51 and 52 extend from the central cup 49 and, when the door is closed, engage the contact pins 42 and 43 respectively. This is the condition shown in solid outline in FIG. 2 and in dotted outline in FIG. 3.

By means of the bridging contactor, electrical continuity is established from the pin 24 to each of the branches 23 whenever the door is closed. As soon as the door is opened, the continuity is broken. It is in this manner that the electrical potential applied across the pins 24 and 26 from an external source is made available between each of the strips 21 and the adjacent strip 23 whenever the door is closed. However, this potential is immediately removed as soon as the door is opened the slightest degree, which opening is effective to unbridge the contacts 42 and 43.

By reason of the described construction, the rodent can safely enter the trap and it is only when the door closes behind him that the electrical energy is applied to the elements in the base. Once the door has closed, it is only necessary for the rodent to make contact with one of the strips fed by the pin 24 and another strip coupled to the pin 26 to shock the animal to death. It has been found that with a 110 volt alternating current applied across the pins 24 and 26, rats and mice are killed readily and yet do not burn. There is, therefore, no odor problem and the rodent can be merely dropped out of the trap upon separation of the base and cover.

It should be understood that a wide variety of materials can be employed. Also, some changes in configuration can be made. For example, while it is presently contemplated that the base, upstanding supports, door, and cover be made of a non-conductive plastic, other non-conductors could also be used. Additional supporting fillets or ribs could be applied between the base and the supports 29 and 31 if desired.

Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An animal trap comprising a housing having an upstanding wall with an opening therein, a door pivotally suspended on said housing for movement from a closed position covering the opening in said housing to an inward, open position whereby the opening is uncovered in response to an inward pressure of an animal against the outer surface of the door and wherein the door returns to a closed position when the animal has entered the housing, bare electrically conductive strips on the floor of the housing, an electrical input means, and switch means for connecting said conductive strips to said electrical input means when said door is in a closed position and for disconnecting said conductive strips from said electrical input means when said door is pivoted inwardly from said closed position, said switch means comprising a conductor connected to a portion of said electrically conductive strips, a second conductor connected to the electrical input means, and a connecting means supported by said door for non-sliding contact with the conductors when said door is in the closed position.

2. An animal trap as described in claim 1 wherein the door is connected to a hinge pin pivotally mounted in the housing, said conductors are in spaced relationship, and an outwardly extending pin is mounted on said hinge pin and is rotatable therewith for contacting said conductors when the door is in the closed position and for rotating out of contact with said conductors when said door is pivoted inwardly from the closed position.

3. An animal trap as described in claim 1 wherein the housing includes supports extending in a direction generally perpendicular to the pivotal axis of the door from a region adjacent to and contiguous with the side edges of the door, and the surface of the door is continuous whereby an animal trapped within the housing is prevented from grasping and opening the door.

References Cited by the Examiner

UNITED STATES PATENTS

| 1,075,995 | 10/13 | Smith | 43—98 |
| 1,166,573 | 1/16 | Beverly | 43—66 |
| 1,899,199 | 2/33 | Kaiser | 43—98 |

FOREIGN PATENTS 458,735   7/50   Italy.

SAMUEL KOREN, *Primary Examiner.*

ABRAHAM G. STONE, *Examiner.*